United States Patent
Inoue et al.

(10) Patent No.: US 10,192,304 B2
(45) Date of Patent: Jan. 29, 2019

(54) METHOD FOR MEASURING PATTERN WIDTH DEVIATION, AND PATTERN INSPECTION APPARATUS

(71) Applicant: NuFlare Technology, Inc., Yokohama-shi (JP)

(72) Inventors: Kazuhiko Inoue, Yokohama (JP); Riki Ogawa, Kawasaki (JP)

(73) Assignee: NuFlare Technology, Inc., Yokohama-shi (JP)

( * ) Notice: Subject to any disclaimer, the term of this patent is extended or adjusted under 35 U.S.C. 154(b) by 189 days.

(21) Appl. No.: 15/255,658

(22) Filed: Sep. 2, 2016

(65) Prior Publication Data

US 2017/0069111 A1 Mar. 9, 2017

(30) Foreign Application Priority Data

Sep. 8, 2015 (JP) ................................ 2015-176536

(51) Int. Cl.
*G06T 7/00* (2017.01)

(52) U.S. Cl.
CPC .... *G06T 7/001* (2013.01); *G06T 2207/30148* (2013.01)

(58) Field of Classification Search
None
See application file for complete search history.

(56) References Cited

U.S. PATENT DOCUMENTS

2002/0028013 A1* 3/2002 Sawa ................... G01B 11/028
382/147

2011/0255770 A1* 10/2011 Touya ................ G01N 21/9503
382/144

(Continued)

FOREIGN PATENT DOCUMENTS

| JP | 2002-81914 A | 3/2002 |
|---|---|---|
| JP | 2003-214820 | 7/2003 |
| JP | 2011-221264 | 11/2011 |

(Continued)

OTHER PUBLICATIONS

Office Action dated Aug. 11, 2017 in Korean Patent Application No. 10-2016-0111630 (with English language translation).

*Primary Examiner* — Delomia L Gilliard
(74) *Attorney, Agent, or Firm* — Oblon, McClelland, Maier & Neustadt, L.L.P.

(57) ABSTRACT

A pattern width deviation measurement method includes measuring width dimensions of a plurality of figure patterns in an optical image from data of gray-scale value profiles of the optical image, using a threshold of a gray-scale value level variably set depending on design dimension information including design width dimension of a corresponding figure pattern of a plurality of figure patterns, and at which influence of a focus position on width dimension becomes smaller, measuring width dimensions of a plurality of corresponding figure patterns in a reference image from data of gray-scale value profiles of the reference image, respectively using the threshold for the corresponding figure pattern of a plurality of figure patterns, and calculating, for each of measured width dimensions of a plurality of figure patterns in the optical image, an amount deviated from a measured width dimension of a corresponding figure pattern in the reference image.

10 Claims, 13 Drawing Sheets

(56) References Cited

U.S. PATENT DOCUMENTS

2014/0348414 A1* 11/2014 Hashimoto ............. G06T 7/001
                                                    382/144
2015/0279024 A1* 10/2015 Tsuchiya ................... G03F 1/84
                                                    382/144

FOREIGN PATENT DOCUMENTS

JP        2014-181966       9/2014
KR    10-2014-0137309 A    12/2014

* cited by examiner

METHOD FOR MEASURING PATTERN WIDTH DEVIATION, AND PATTERN INSPECTION APPARATUS

CROSS-REFERENCE TO RELATED APPLICATION

This application is based upon and claims the benefit of priority from the prior Japanese Patent Application No. 2015-176536 filed on Sep. 8, 2015 in Japan, the entire contents of which are incorporated herein by reference.

BACKGROUND OF THE INVENTION

Field of the Invention

Embodiments of the present invention relate generally to a method for measuring an amount of pattern width deviation, and to a pattern inspection apparatus. More specifically, embodiments of the present invention relate, for example, to a pattern width deviation measuring method of an inspection apparatus which inspects a pattern by radiating a light beam to acquire an optical image of the pattern image.

Description of Related Art

In recent years, with the advance of high integration and large capacity of large-scale integration (LSI) circuits, the line width (critical dimension) required for circuits of semiconductor elements is becoming progressively narrower. Such semiconductor elements are manufactured by circuit formation of exposing and transferring a pattern onto a wafer by means of a reduced projection exposure apparatus known as a stepper while using an original or "master" pattern (also called a mask or a reticle, hereinafter generically referred to as a mask) with a circuit pattern formed thereon. Then, in fabricating a mask for transfer printing such a fine circuit pattern onto a wafer, a pattern writing apparatus using electron beams, capable of writing or "drawing" fine circuit patterns, needs to be employed. Pattern circuits may be written directly on the wafer by the pattern writing apparatus. Also, a laser beam writing apparatus that uses laser beams in place of electron beams for writing a pattern is under development.

Since LSI manufacturing requires a tremendous amount of manufacturing cost, it is crucial to improve its yield. However, as typified by a 1-gigabit DRAM (Dynamic Random Access Memory), the scale of patterns configuring an LSI is in transition from on the order of submicrons to nanometers. One of major factors that decrease the yield of the LSI manufacturing is due to pattern defects on the mask used for exposing and transfer printing an ultrafine pattern onto a semiconductor wafer by the photolithography technology. In recent years, with miniaturization of dimensions of LSI patterns formed on a semiconductor wafer, dimension to be detected as a pattern defect has become extremely small. Therefore, a pattern inspection apparatus for inspecting defects on a transfer mask used in manufacturing LSI needs to be more highly accurate.

As an inspection method, there is known a method of comparing an optical image obtained by imaging a pattern formed on a target object or "sample" such as a lithography mask at a predetermined magnification by using a magnification optical system with design data or an optical image obtained by imaging the same pattern on the target object. For example, the methods described below are known as pattern inspection methods: the "die-to-die inspection" method that compares data of optical images of identical patterns at different positions on the same mask; and the "die-to-database inspection" method that inputs, into an inspection apparatus, writing data (design pattern data) generated by converting pattern-designed CAD data to a writing apparatus specific format to be input to the writing apparatus when a pattern is written on the mask, generates design image data (reference image) based on the input writing data, and compares the generated design image data with an optical image (serving as measurement data) obtained by imaging the pattern. In such inspection methods for use in the inspection apparatus, a target object is placed on the stage so that a light flux may scan the target object as the stage moves in order to perform an inspection. Specifically, the target object is irradiated with a light flux from the light source through the illumination optical system. Light transmitted through the target object or reflected therefrom forms an image on a sensor through the optical system. The image captured by the sensor is transmitted as measurement data to the comparison circuit. After performing position adjustment of images, the comparison circuit compares measurement data with reference data in accordance with an appropriate algorithm, and determines that there exists a pattern defect if the compared data are not identical.

In the pattern inspection, in addition to inspecting a pattern defect (shape defect), it is also required to measure a line width (CD, critical dimension) deviation of a pattern. Conventionally, measuring a pattern line width (CD) deviation has been performed using a dedicated measuring device. If this measurement can be simultaneously performed at the time of pattern defect inspection, a significant advantage cost-wise and inspection-time-wise can be achieved. Therefore, it is becoming increasingly requested for the inspection apparatus to have such a measurement function. Regarding measuring CD deviation, there is proposed an inspection method for measuring line width deviation of a pattern in an image acquired for each set region (for example, refer to Japanese Patent Application Laid-open (JP-A) No. 2014-181966).

In order to measure CD deviation by using the inspection apparatus, it is necessary to measure deviation of a pattern width formed on the real mask with respect to mask design data. Therefore, an optical image of a real mask needs to be captured. While moving the stage on which the real mask is placed, the image-capturing is performed. The focus position needs to be changed dynamically because it changes according to unevenness of a pattern. If auto-focus adjustment cannot follow the stage moving speed, following error of the focus position occurs. Since the profile of a captured image changes when a following error of the focus position arises, it becomes difficult to measure an accurate line width. As a result, error occurs in measuring CD deviation, and thus, there occurs a problem that the measurement accuracy degrades.

If the stage moving speed is decreased in order to reduce following errors of the focus position, the inspection time is prolonged, thereby degrading the throughput of the inspection apparatus. Accordingly, it is required to inhibit the degradation of the measurement accuracy without decreasing the stage moving speed.

BRIEF SUMMARY OF THE INVENTION

According to one aspect of the present invention, a pattern width deviation measurement method includes acquiring an optical image of a plurality of figure patterns formed on a mask substrate; generating a reference image of a region corresponding to the optical image, based on design data serving as a base for forming the plurality of figure patterns on the mask substrate;

measuring width dimensions of the plurality of figure patterns in the optical image from data of gray-scale value profiles of the optical image, using a detection threshold of a gray-scale value level which is variably set depending on design dimension information including design width dimension of a corresponding figure pattern of the plurality of figure patterns, and at which influence of a focus position on width dimension becomes smaller; measuring width dimensions of a plurality of corresponding figure patterns in the reference image from data of gray-scale value profiles of the reference image, respectively using the detection threshold for the corresponding figure pattern of the plurality of figure patterns; and calculating, for each of measured width dimensions of the plurality of figure patterns in the optical image, a dimension deviation amount deviated from a measured width dimension of a corresponding figure pattern in the reference image, and outputting the dimension deviation amount calculated.

According to another aspect of the present invention, a pattern inspection apparatus includes an optical image acquisition mechanism, including a stage on which a mask substrate where a plurality of figure patterns are formed is placed and an illumination optical system for illuminating the mask substrate, configured to acquire an optical image of the plurality of figure patterns formed on the mask substrate; a reference image generation processing circuitry configured to generate a reference image of a region corresponding to the optical image, based on design data serving as a base for forming the plurality of figure patterns on the mask substrate; a first width dimension calculation processing circuitry configured to measure width dimensions of the plurality of figure patterns in the optical image from data of gray-scale value profiles of the optical image, using a detection threshold of a gray-scale value level which is variably set depending on design dimension information including design width dimension of a corresponding figure pattern of the plurality of figure patterns, and at which influence of a focus position on width dimension becomes smaller; a second width dimension calculation processing circuitry configured to measure width dimensions of a plurality of corresponding figure patterns in the reference image from data of gray-scale value profiles of the reference image, respectively using the detection threshold for the corresponding figure pattern of the plurality of figure patterns; and a dimension deviation amount calculation processing circuitry configured to calculate, for each of measured width dimensions of the plurality of figure patterns in the optical image, a dimension deviation amount deviated from a measured width dimension of a corresponding figure pattern in the reference image.

DETAILED DESCRIPTION OF THE INVENTION

First Embodiment

A first embodiment of the present invention describes a measuring method and an inspection apparatus that can measure CD deviation highly accurately even if a following error of the focus position occurs.

With regard to precision required for inspection sensitivity of an inspection apparatus, around several nanometers is assumed, for example. Therefore, if whether the width is a desired design width or not is directly measured from the image where a following error of the focus position has occurred, it becomes difficult to measure with such precision a pattern line width CD deviation (ΔCD). According to the first embodiment, CD deviation (ΔCD) is measured using a width dimension for inspection aside from a design width dimension.

Figure 1:
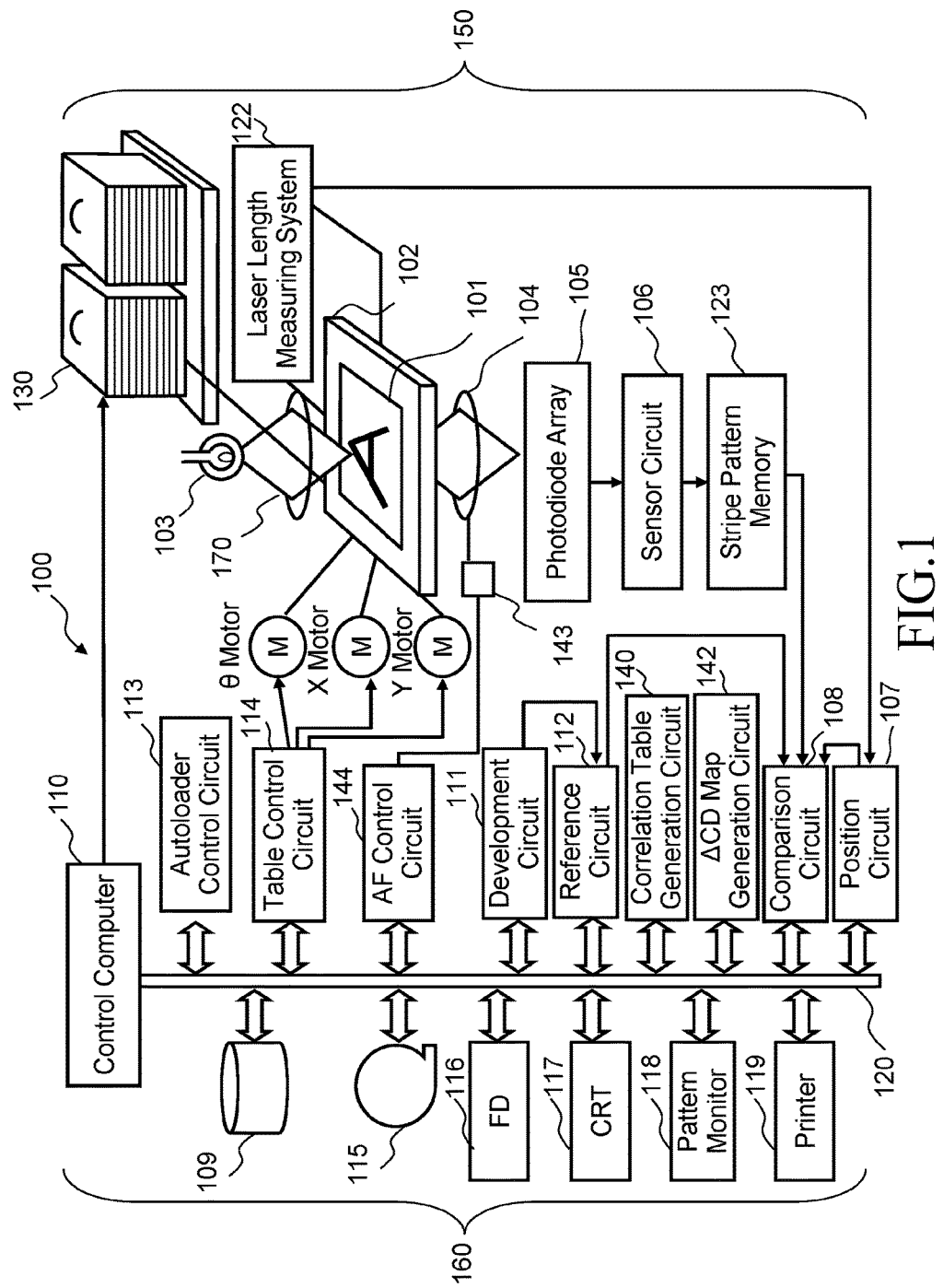
FIG. 1 illustrates a configuration of a pattern inspection apparatus according to a first embodiment.

FIG. 1 illustrates a configuration of a pattern inspection apparatus according to the first embodiment. As shown in FIG. 1, an inspection apparatus 100 that inspects defects and line width CD deviation (ΔCD) of a pattern formed on a target object such as a mask substrate includes an optical image acquisition mechanism 150 and a control system circuit 160 (control unit).

The optical image acquisition mechanism 150 includes a light source 103, an illumination optical system 170, an XYθ table 102 arranged movably, a magnifying optical system 104, a photodiode array 105 (an example of a sensor), a sensor circuit 106, a stripe pattern memory 123, and a laser length measuring system 122. A mask substrate 101 is placed on the XYθ table 102. The mask substrate 101 is, for example, an exposure photomask used for transfer printing a pattern onto a wafer. A plurality of figure patterns to be inspected are formed on the photomask. The mask substrate 101, for example, with its pattern forming surface facing downward, is arranged on the XYθ table 102.

In the control system circuit 160, a control computer 110 is connected, through a bus 120, to a position circuit 107, a comparison circuit 108, a development circuit 111, a reference circuit 112, an autoloader control circuit 113, a table control circuit 114, a correlation table generation circuit 140, a CD deviation (ΔCD) map generation circuit 142, an auto-focus (AF) control circuit 144, a magnetic disk drive 109, a magnetic tape drive 115, a flexible disk drive (FD) 116, a CRT 117, a pattern monitor 118, and a printer 119. The sensor circuit 106 is connected to the stripe pattern memory 123 which is connected to the comparison circuit 108. The XYθ table 102 is driven by motors of X-, Y-, and θ-axis. The XYθ table 102 serves as an example of the stage. Design data, based on which a plurality of figure patterns are formed on the mask substrate 101, is input from the outside of the inspection apparatus 100, and stored in the magnetic disk drive 109.

In the inspection apparatus 100, an inspection optical system of large magnification is composed of the light source 103, the XYθ table 102, the illumination optical system 170, the magnifying optical system 104, the photodiode array 105, and the sensor circuit 106. The XYθ table 102 is driven by the table control circuit 114 under the control of the control computer 110. The XYθ table 102 can be moved by a drive system such as a three-axis (X, Y, and θ) motor, which drives the table in the directions of x, y, and θ. For example, a step motor can be used as each of these X, Y, and θ motors. The XYθ table 102 is movable in the horizontal direction and the rotation direction by the motors of the X-, Y-, and θ-axis. The movement position of the XYθ table 102 is measured by the laser length measuring system 122, and supplied to the position circuit 107. The focus position of the magnifying optical system 104 toward the pattern forming surface of the mask substrate 101 is adjusted by controlling the height position in the optical axis direction of the magnifying optical system 104 by a piezoelectric element 143 controlled by the AF control circuit 144.

FIG. 1 shows a configuration necessary for describing the first embodiment. It should be understood that other configuration elements generally necessary for the inspection apparatus 100 may also be included therein.

Figure 2:
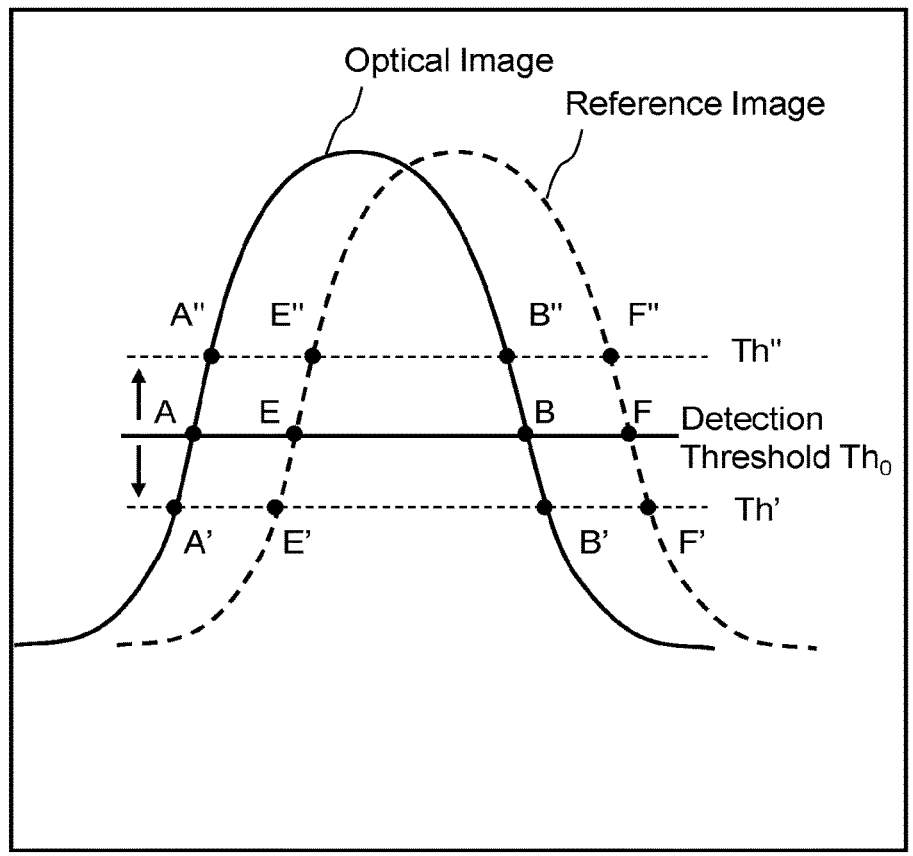
FIG. 2 shows examples of profiles of a pattern in an optical image and a pattern in a reference image according to the first embodiment.

FIG. 2 shows examples of profiles of a pattern in an optical image and a pattern in a reference image according to the first embodiment. As will be described in detail later, a dimension error (deviation) (ΔCD) of the width of a pattern formed on the mask substrate 101 can be obtained by comparing a gray-scale value profile of a pattern in an optical image obtained by capturing a pattern forming region of the mask substrate 101 with a gray-scale value profile of a pattern in a reference image generated from design data corresponding to the pattern. In FIG. 2, a width dimension (CD: critical dimension) of a pattern formed on the mask substrate 101 can be obtained by measuring the dimension between A and B (for example, width of space pattern) of the gray-scale value profile of the pattern in the optical image at a detection threshold (or "inspection threshold") $Th_0$ which leads the dimension between E and F of FIG. 2 to become a desired design width dimension in the gray-scale value profile of the pattern in the reference image. Therefore, a pattern width dimension deviation (ΔCD: line width dimension error) can be obtained as a difference value which is calculated by subtracting the dimension between E and F of the reference image from the dimension between A and B of the optical image at the threshold $Th_0$. Regarding the threshold value $Th_0$, the same value is used with respect to all the patterns. In other words, a reference image is generated and an optical image is captured, based on a threshold model in which a desired dimension can be obtained at the threshold $Th_0$ on design data.

Figure 3:
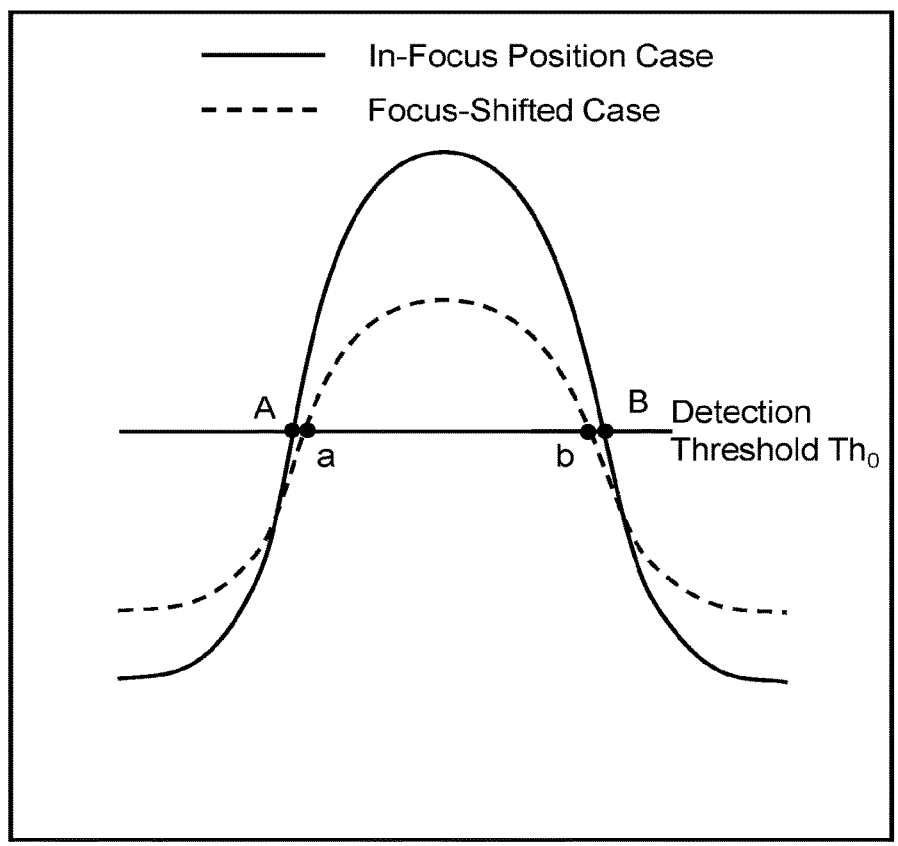
FIG. 3 shows an example of the profile of a pattern in an optical image in the case of the focus position being changed according to the first embodiment.

FIG. 3 shows an example of the profile of a pattern in an optical image in the case of the focus position being changed according to the first embodiment. The solid line in FIG. 3 shows the profile of a pattern obtained by image-capturing in an in-focus state. The width CD of the pattern image-captured in the in-focus state is detected as the dimension between A and B from the threshold $Th_0$ described above. However, if image-capturing is performed in a state shifted from a focus position (out-of-focus state), the captured image is different, as shown by the dotted line profile of the same pattern, from that captured in the in-focus state. The width CD of the pattern image-captured in the focus-shifted state shown by the dotted line is detected as the dimension between a and b from the threshold $Th_0$ described above. As shown in FIG. 3, since the profile of a captured-image changes when the focus position becomes different, measuring a precise line width becomes difficult. Consequently, an error occurs in measuring CD deviation, and therefore, the measurement precision degrades. In other words, if a following error of the focus position by autofocus control occurs, it becomes difficult to measure a precise line width.

Figures 4A, 4B:
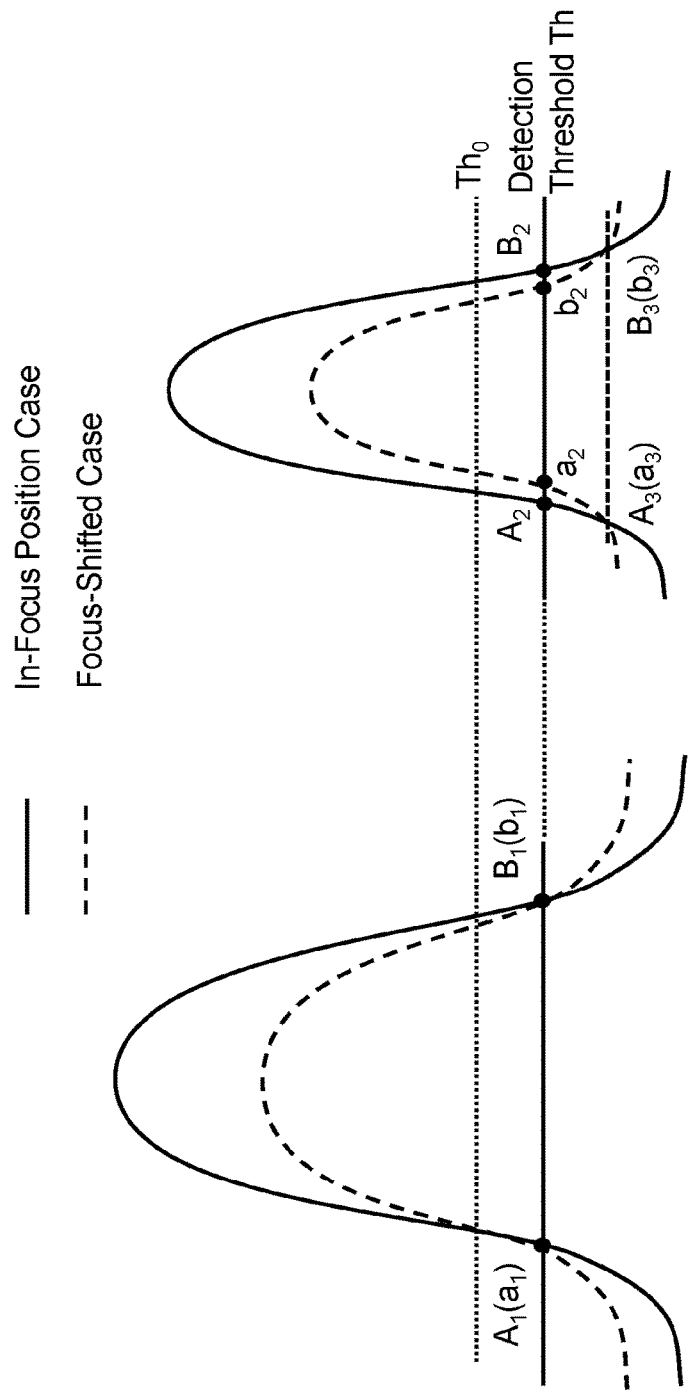
FIGS. 4A and 4B show examples of pattern profiles of different line widths and a detection threshold according to the first embodiment.

FIGS. 4A and 4B show examples of pattern profiles of different line widths and a detection threshold according to the first embodiment. As described with reference to FIG. 3, when the focus position changes, the profile of a captured image changes, and therefore, if a line width is detected by using the conventional detection threshold $Th_0$, an error occurs in the width CD of the detected pattern. However, as shown in FIG. 4A, if the same pattern is image-captured while the focus position is changed, although the profile changes at each position, there exists a position where the line widths are the same. In the example of FIG. 4A, there is a gray-scale value level at which the dimension between $A_1$ and $B_1$ of the profile (solid line) of the pattern image-captured in the in-focus state and the dimension between $a_1$ and $b_1$ of the profile (dotted line) of the pattern image-captured in the focus-shifted (out-of-focus) state are identical to each other. Although only one focus-shifted state is shown in the example of FIG. 4A, it has turned out that, as long as at the gray-scale value level at which the dimension between $A_1$ and $B_1$ and the dimension between $a_1$ and $b_1$ are identical to each other, even when the focus position is shifted to a plurality of positions, the dimension in the in-focus state and the dimension in the focus-shifted state are identical to each other. This gray-scale value level is a level at which the influence of the focus position on width dimension becomes smaller (for example, line width dimensions are identical to each other independent of the focus position, or the influence of the focus position on width dimension becomes minimum). Therefore, a detection threshold Th which is independent of the focus position can be obtained by setting it not at the detection threshold $Th_0$ but at the gray-scale value level at which the dimension between $A_1$ and $B_1$ and the dimension between $a_1$ and $b_1$ are identical to each other.

As shown in FIG. 2, for example, when a detection threshold Th' is set by lowering the gray-scale value level of the detection threshold $Th_0$, the dimension between A' and B' of the optical image detected by the detection threshold Th' is different from the dimension between A and B of the optical image detected by detection threshold $Th_0$. Similarly, the dimension between E' and F' of the reference image detected by the detection threshold Th' is different from the dimension between E and F of the reference image detected by detection threshold $Th_0$. However, the CD deviation (ΔCD) obtained by subtracting the line width of the pattern in the reference image from the line width of the pattern in the optical image, the CD deviation (ΔCD) being defined by a difference value obtained by [(dimension between A and B)−(dimension between E and F)], is identical or almost identical to a difference value obtained by [(dimension between A' and B')−(dimension between E' and F')]. Therefore, even when the detection threshold Th' is set by lowering the gray-scale value level of the detection threshold Th$_0$, the CD deviation (ΔCD) can be calculated substantially similarly to the case detected by the detection threshold Th$_0$.

For example, when a detection threshold Th" is set by raising the gray-scale value level of the detection threshold Th$_0$, the dimension between A" and B" of the optical image detected by the detection threshold Th" is different from the dimension between A and B of the optical image detected by detection threshold Th$_0$. Similarly, the dimension between E" and F" of the reference image detected by the detection threshold Th" is different from the dimension between E and F of the reference image detected by detection threshold Th$_0$. However, the CD deviation (ΔCD) obtained by subtracting the line width of the pattern in the reference image from the line width of the pattern in the optical image, the CD deviation (ΔCD) being defined by a difference value obtained by [(dimension between A and B)−(dimension between E and F)], is identical or almost identical to a difference value obtained by [(dimension between A" and B")−(dimension between E" and F")]. Therefore, even when the detection threshold Th" is set by raising the gray-scale value level of the detection threshold Th$_0$, the CD deviation (ΔCD) can be calculated substantially similarly to the case detected by the detection threshold Th$_0$.

Therefore, as shown in FIG. 4A, the dimension between A$_1$ and B$_1$ (dimension between a$_1$ and b$_1$) of the optical image is detected by a detection threshold Th at which the influence of the focus position on width dimension becomes smaller (for example, line width dimensions are identical to each other independent of the focus position, or the influence of the focus position on width dimension becomes minimum), and the dimension between E$_1$ and F$_1$ (not shown) of the reference image is detected by a detection threshold Th at which the influence of the focus position on width dimension becomes smaller (for example, line width dimensions are identical to each other independent of the focus position, or the influence of the focus position on width dimension becomes minimum). Then, by calculating a difference value by [(dimension between A$_1$ and B$_1$)−(dimension between E$_1$ and F$_1$)], the same value as the difference value (ΔCD) obtained by [(dimension between A and B)−(dimension between E and F)] in the in-focus state can be acquired.

However, as shown in FIG. 4B, with respect to patterns of different widths on design data, it turns out that the dimension between A$_2$ and B$_2$ of the profile (solid line) of the pattern image-captured in the in-focus state and the dimension between a$_2$ and b$_2$ of the profile (dotted line) of the pattern image-captured in the focus-shifted state are not identical to each other at the gray-scale value level at which the dimension between A$_1$ and B$_1$ and the dimension between a$_1$ and b$_1$ are identical to each other as shown in the pattern of FIG. 4A. However, with respect to the pattern of a different line width shown in FIG. 4B, there exists a gray-scale value level at which the dimension between A$_3$ and B$_3$ and the dimension between a$_3$ and b$_3$ are identical to each other at the position different from the gray-scale value level at which the dimension between A$_1$ and B$_1$ and the dimension between a$_1$ and b$_1$ are identical to each other. Thus, at least for each pattern width dimension, there exists a gray-scale value level at which the influence of the focus position on width dimension becomes smaller (for example, line width dimensions are identical to each other independent of the focus position, or the influence of the focus position on width dimension becomes minimum). Then, according to the first embodiment, the detection threshold is set as described below.

Figure 5:
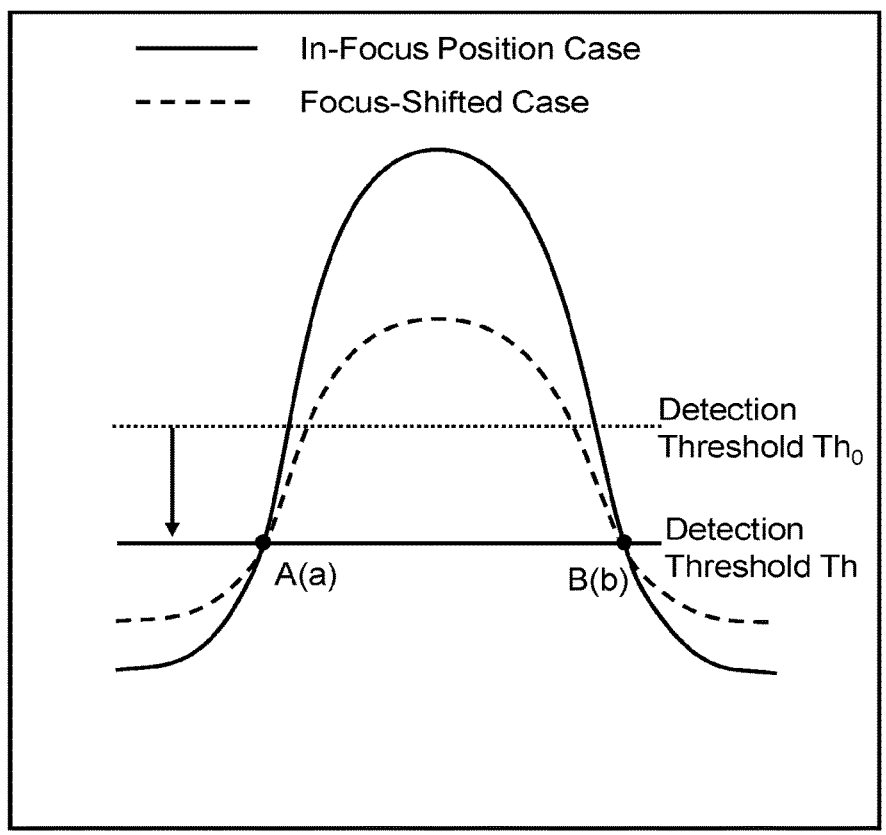
FIG. 5 illustrates a method for setting a detection threshold according to the first embodiment.

FIG. 5 illustrates a method for setting a detection threshold according to the first embodiment. As a result of considering the detection threshold, it has been found that the gray-scale value level, at which line width dimensions are identical to each other independent of the focus position, depends upon a duty ratio (line width ratio between line pattern (or rectangular pattern) and space pattern) of the pattern concerned in the design data, and upon an arrangement pitch Pin the design data, in addition to upon the pattern width dimension in the design data. Then, according to the first embodiment, the gray-scale value level at which the influence of the focus position on width dimension becomes smaller (for example, line width dimensions are identical to each other independent of the focus position, or the influence of the focus position on width dimension becomes minimum) is set, as the detection threshold Th, for each design dimension information which defines a width dimension, a duty ratio, and an arrangement pitch P of a pattern in design data. That is, as shown in FIG. 5, ΔCD is calculated for each pattern by using the detection threshold Th at which line width dimensions (dimension between A and B, and dimension between a and b) are identical to each other independent of the focus position, not using the detection threshold Th$_0$ at which the line width CD of the pattern concerned in the design data can be obtained. In other words, the line width CD (design width dimension) in design data is not measured, but line widths (width dimensions for inspection) being identical to each other independent of the focus position are measured.

Figure 6:
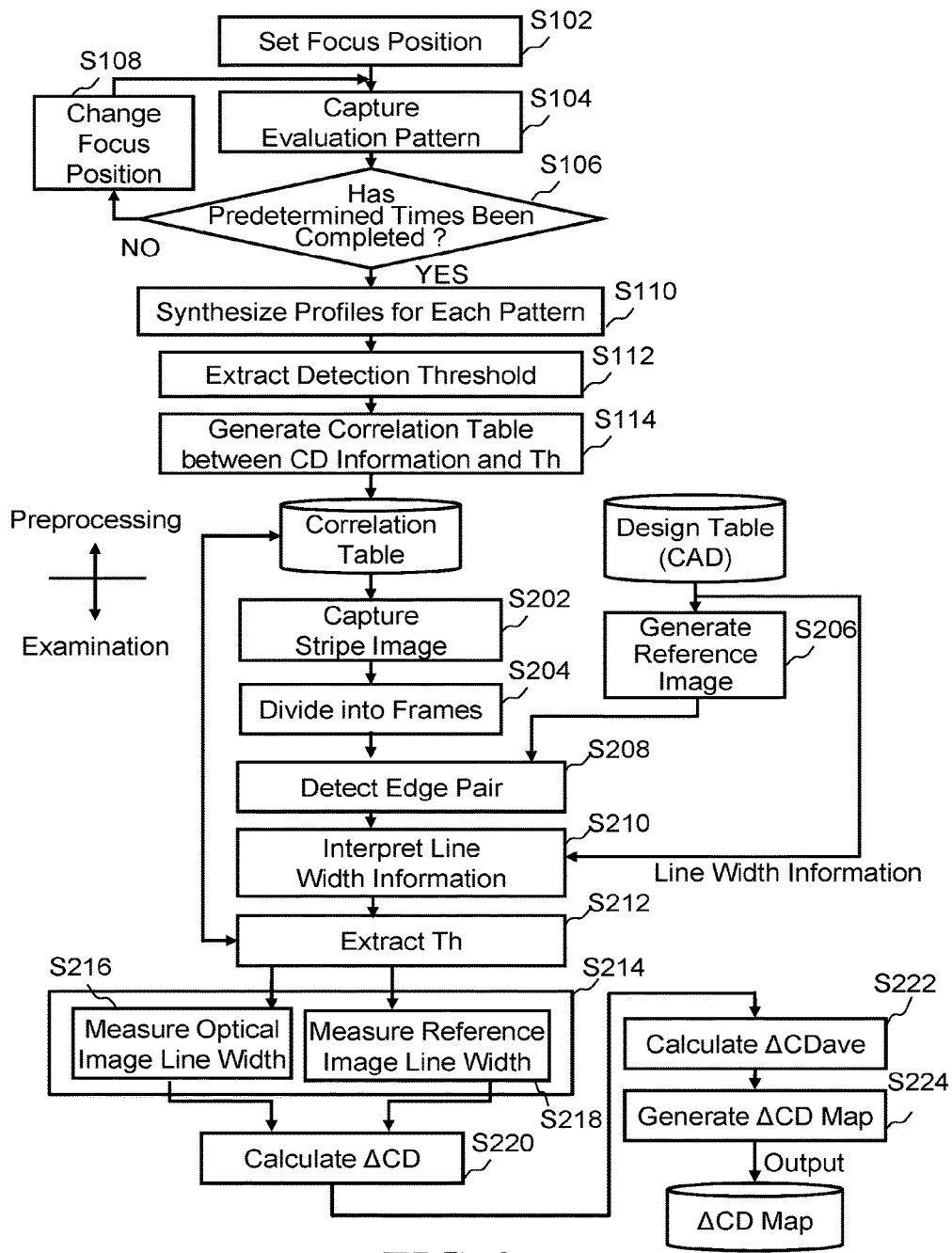
FIG. 6 is a flowchart showing main steps of a method for measuring an amount of deviation of a pattern width dimension according to the first embodiment.

FIG. 6 is a flowchart showing main steps of a method for measuring an amount of deviation of a pattern width dimension according to the first embodiment. As shown in FIG. 6, the method for measuring an amount of deviation of a pattern width dimension of the first embodiment executes a series of steps: a pre-processing step, a stripe image capturing step (S202), a dividing-into-frames step (S204), a reference image generation step (S206), an edge pair detection step (S208), a line width information interpretation step (S210), a detection threshold Th extraction step (S212), a line width measuring step (S214), a width error ΔCD calculation step (S220), an average width error ΔCDave calculation step (S222), and a width error ΔCD map generation step (S224).

Moreover, the line width measuring step (S214) executes a series of steps as internal steps: an optical image line width measuring step (S216) and a reference image line width measuring step (S218).

The pre-processing step described above executes a series of steps as its internal steps: a focus position setting step (S102), an evaluation pattern image-capturing step (S104), a determination step (S106), a focus position change step (S108), a profile synthesizing step (S110), a detection threshold extraction step (S112), and a correlation table generation step (S114) of between line width CD information and detection threshold Th.

Figure 7:
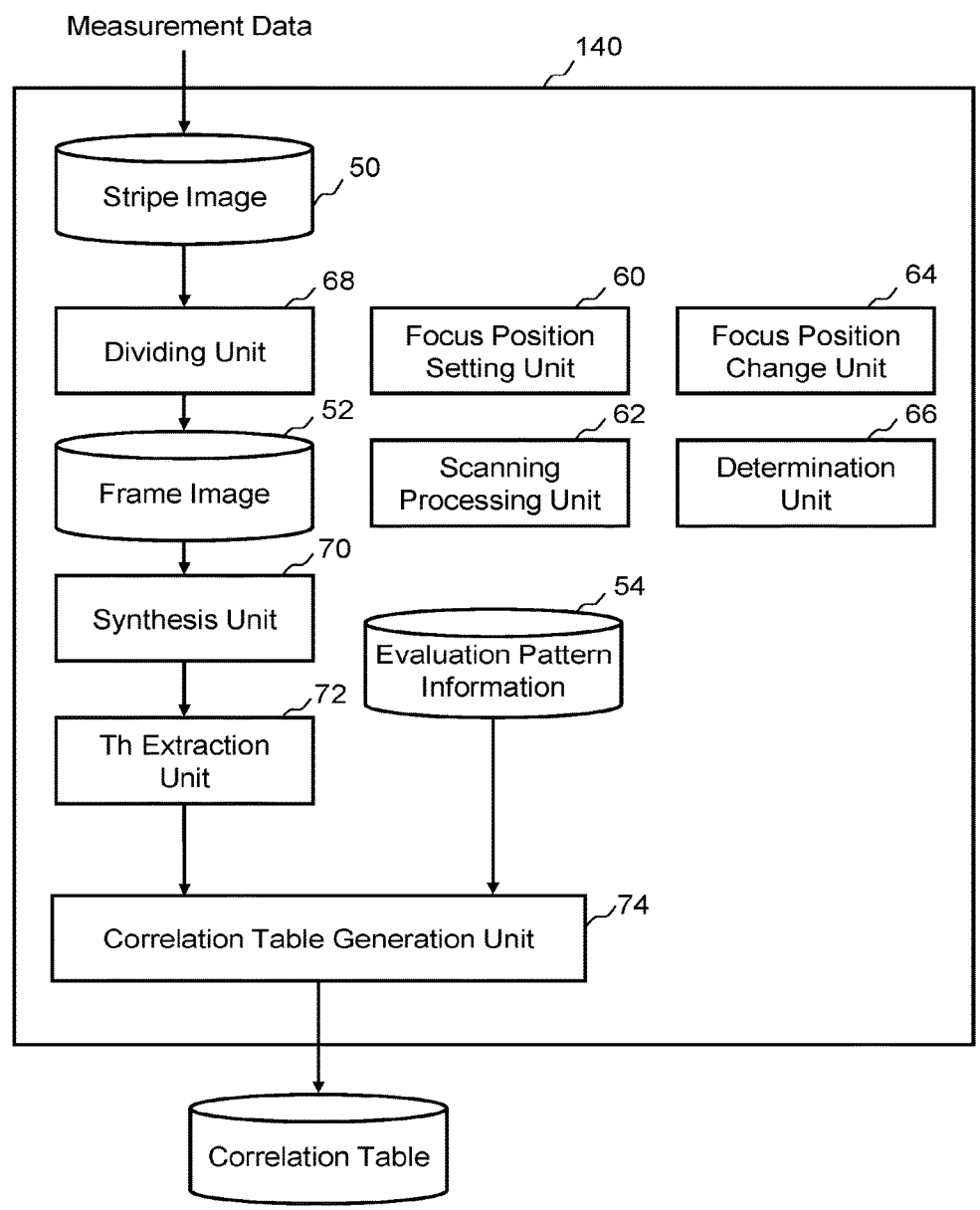
FIG. 7 shows an internal configuration of a correlation table generation circuit according to the first embodiment.

FIG. 7 shows an internal configuration of a correlation table generation circuit according to the first embodiment. As shown in FIG. 7, in the correlation table generation circuit 140 of the first embodiment, there are arranged storage devices 50, 52, and 54, such as magnetic disk drives, a focus position setting unit 60, a scanning processing unit 62, a focus position change unit 64, a determination unit 66, a dividing unit 68 for dividing into frames, a synthesis unit 70, a detection threshold extraction unit 72, and a correlation table generation unit 74. Each " . . . unit", such as the focus position setting unit 60, the scanning processing unit 62, the focus position change unit 64, the determination unit 66, the dividing unit 68 for dividing into frames, the synthesis unit 70, the detection threshold extraction unit 72, and the correlation table generation unit 74 includes a processing circuitry. As the processing circuitry, for example, an electric circuit, computer, processor, circuit board, quantum circuit, or semiconductor device may be used. Each " . . . unit" may use a common processing circuitry (same processing circuitry), or different processing circuitries (separate processing circuitries). Data required in the correlation table generation circuit 140, and calculated results are stored in the memory (not shown) each time.

According to the first embodiment, before starting to inspect a line width deviation of a pattern formed on the mask substrate 101, a pre-processing step for obtaining a gray-scale value level which depends on design dimension information including a width dimension (design width dimension) of a figure pattern in design data and makes the influence of the focus position on width dimension smaller (for example, line width dimensions are identical to each other independent of the focus position, or the influence of the focus position on width dimension becomes minimum) is performed by experiment by using an evaluation substrate with evaluation patterns formed thereon. Then, regarding width dimensions being identical to each other independent of the focus position of each obtained design dimension information as width dimension for inspection, a gray-scale value level corresponding to the width dimension for inspection is defined as a detection threshold Th with respect to the figure pattern matching to the design dimension information. First, the relation between the design dimension information and the detection threshold Th is to be obtained.

Figure 8:
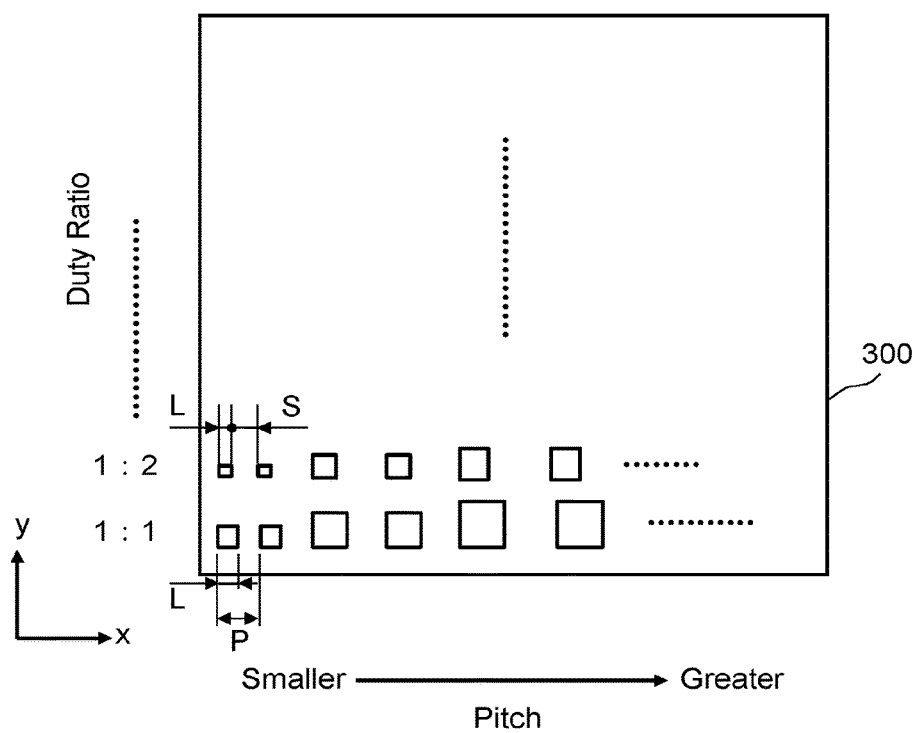
FIG. 8 shows an example of an evaluation pattern according to the first embodiment.

FIG. 8 shows an example of an evaluation pattern according to the first embodiment. In an evaluation substrate 300 of FIG. 8, there are formed, as evaluation patterns, a plurality of figure patterns whose figure pattern line width (rectangular pattern portion and/or space pattern portion), arrangement pitch P, and duty ratio are designed variably. In the example of FIG. 8, the arrangement pitch of the rectangular patterns increases in order along the abscissa axis (x axis), and the duty ratio changes along the ordinate axis (y axis). For example, as the duty ratio, the ratio (L:S) between the line width L of a rectangular pattern and the line width S of a space pattern changes in order, such as 1:1, 1:2, 1:3, . . . , from the lower side. In the example of FIG. 8, a plurality of figure patterns of the same duty ratio are formed in the same row in the x direction, where the rows are arrayed in the y direction, and a plurality of figure patterns of the same pitch P are formed in the same column in the y direction, where the columns are arrayed in the x direction. Although rectangular patterns are used in the example of FIG. 8, it is not limited thereto. For example, line patterns extending in the y direction may be used. The level difference in the height direction (also referred to as z direction or optical axis direction) between the exposed surface of a rectangular pattern and the exposed surface of a space pattern is preferably the same size as the level difference of the mask substrate 101 to be inspected. For example, it is preferable to be about 50 to 80 nm. The evaluation substrate 300 may, for example, have a glass substrate on which a rectangular pattern is formed using a light shielding film of chromium (Cr) and the like. In such a structure, the exposed surface of the rectangular pattern is the surface of the light shielding film, and the exposed surface of the space pattern is the surface of the glass substrate (surface of the pattern forming surface side). The materials, namely the light shielding film and the glass substrate, of the exposed surfaces may be inverse to each other. Data, in the design data, on a plurality of figure patterns configuring the evaluation patterns is stored in the storage device 54.

As the preprocessing, the evaluation substrate 300 is placed on the XYθ table 102. The size of the evaluation substrate 300 is preferably the same as that of the mask substrate 101 to be inspected. However, it is not limited thereto. Any size is acceptable as long as it can be placed on the XYθ table 102.

In the focus position setting step (S102), the focus position setting unit 60 sets the focus position with respect to the mask substrate 101 surface (pattern forming surface) of the magnifying optical system 104, to the initial position. For example, a plurality of focus positions close to and including the best focus position (in-focus position) for the height position of the exposed surface of a rectangular pattern are determined in advance, and then, one of them is set as the initial position. For example, the maximum shifted position (e.g., −100 nm), shifted to the minus side from the best focus position, is set as the initial position. Then, a request signal (a command) for controlling the focus position of the magnifying optical system 104 regarding the mask substrate 101 surface (pattern forming surface) side of the magnifying optical system 104 to this position is output to the AF control circuit 144. The AF control circuit 144 drives the piezoelectric element 143 to adjust the height position of the magnifying optical system 104 so that this position may be the focus position.

In the evaluation pattern image-capturing step (S104), the scanning processing unit 62 outputs a control signal to the control computer 110 in order to image-capture a plurality of figure patterns configuring the evaluation patterns at such focus positions. In response to the control signal, under the control of the control computer 110, the optical image acquisition mechanism 150 acquires optical images of a plurality of figure patterns configuring the evaluation patterns formed on the evaluation substrate 300.

A plurality of figure patterns formed on the evaluation substrate 300 are irradiated with a laser light (e.g., DUV light), from the appropriate light source 103 through the illumination optical system 170, which is used as an inspection light and whose wavelength is shorter than or equal to that of the ultraviolet region. The light having passed through the evaluation substrate 300 is focused, through the magnifying optical system 104, to form an image on the photodiode array 105 (an example of a sensor) as an optical image to be input thereinto. It is preferable to use, for example, a TDI (time delay integration) sensor, etc. as the photodiode array 105.

Figure 9:
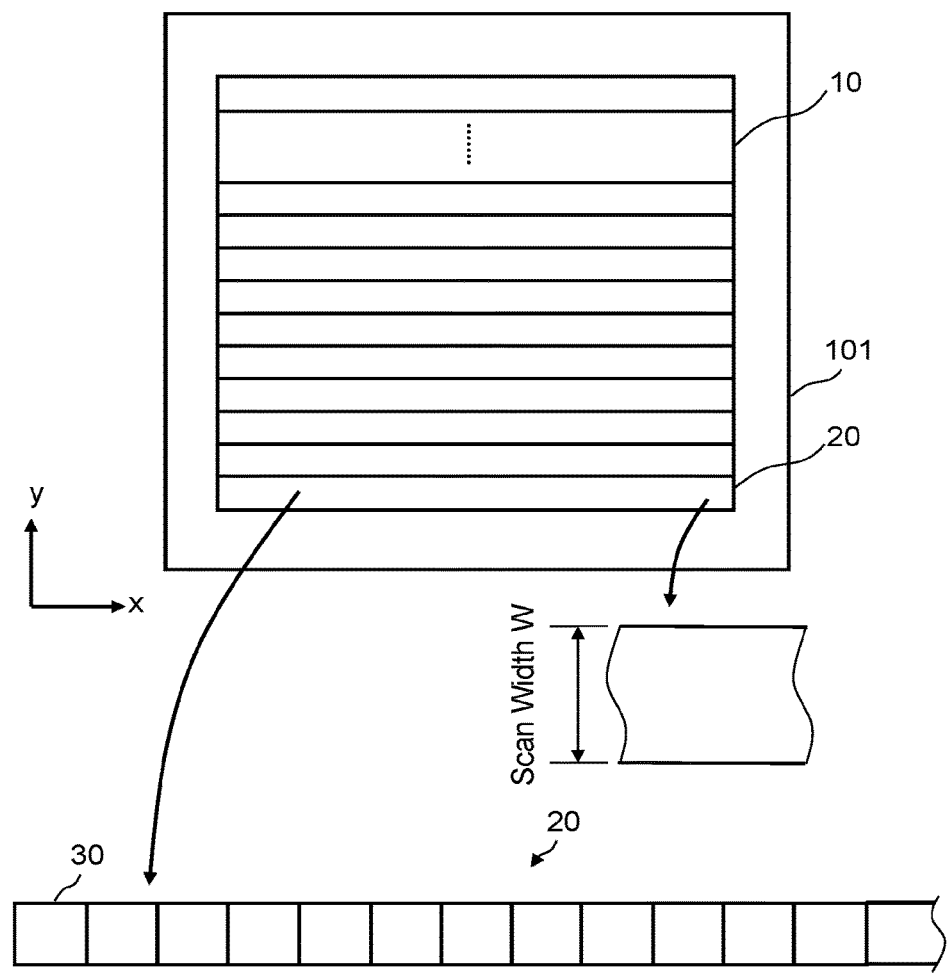
FIG. 9 is a conceptual diagram illustrating an inspection region according to the first embodiment.

FIG. 9 is a conceptual diagram illustrating an inspection region according to the first embodiment. As shown in FIG. 9, an inspection region 10 (entire inspection region) of the mask substrate 101 is virtually divided into a plurality of strip-shaped inspection stripes 20 each having a scan width W in the y direction, for example. The inspection apparatus 100 acquires an image (strip region image) from each inspection stripe 20. That is, with respect to each of the inspection stripes 20, the inspection apparatus 100 captures an image of a figure pattern arranged in the stripe region concerned by using a laser light in the longitudinal direction (x direction) of the stripe region concerned. The photodiode array 105 acquires optical images while continuously moving relatively in the x direction by the movement of the XYθ table 120. The photodiode array 105 continuously captures optical images each having a scan width W as shown in FIG. 9. In other words, while moving relatively to the XYθ table 120 (stage), the photodiode array 105 being an example of a sensor captures optical images of patterns formed on the mask substrate 101 by using an inspection light. According to the first embodiment, after capturing an optical image in one inspection stripe 20, the photodiode array 105 moves in the y direction to the position of the next inspection stripe 20 and similarly captures another optical image having a scan width W continuously while moving in the direction reverse to the last image capturing direction. Thereby, the image capturing is repeated in the forward (FWD) and backward (BWD) directions, namely changing the direction reversely when advancing and returning.

The direction of the image capturing is not limited to repeating the forward (FWD) and backward (BWD) movement. Images may be captured in a fixed one direction. For example, it is sufficient to repeat FWD and FWD, or alternatively, to repeat BWD and BWD.

Optical images are also acquired with respect to the evaluation substrate 300 similarly to the mask substrate 101.

A pattern image focused/formed on the photodiode array 105 is photoelectrically converted by each light receiving element of the photodiode array 105, and further, analog-to-digital (A/D) converted by the sensor circuit 106. Then, pixel data for each inspection stripe 20 is stored in the stripe pattern memory 123. When imaging such pixel data (stripe region image), a dynamic range whose maximum gray level is defined as the case of, for example, 100% of the quantity of illumination light being incident is used as the dynamic range of the photodiode array 105. Then, the stripe region image is sent to the correlation table generation circuit 140, with data indicating the position of the photomask 101 on the XYG table 102 output from the position circuit 107. Measurement data (pixel data) is 8-bit unsigned data, for example, and indicates a gray level (light intensity) of brightness of each pixel. The stripe region image input into the correlation table generation circuit 140 is stored in the memory 50.

As described above, a strip region image (optical image) is acquired for each of a plurality of inspection stripes 20 (stripe regions) which are obtained by virtually dividing the inspection region 10 of the mask substrate 101 into a plurality of strip-shaped regions. As will be described later, a stripe region image is divided in the x direction into a plurality of frame images by the width the same as that of the inspection stripe 20, for example, a scan width W. Thus, the inspection region 10 is virtually divided into a plurality of frame regions 30 each having the frame image size. In other words, the inspection region 10 of the photomask is virtually divided into a plurality of strip-shaped inspection stripes 20 by the size of one side (size in the y direction) of the frame region 30, and each of the inspection stripes 20 is virtually divided into a plurality of frame regions 30 by the size of the other side (size in the x direction) of the frame region 30.

A stripe region image captured from the evaluation substrate 300 is also divided into a plurality of images in accordance with a plurality of frame regions 30. Specifically, for each inspection stripe 20, the dividing unit 68 for dividing into frames divides, in the x direction, a stripe region image (optical image) into a plurality of frame images (optical images) by a predetermined size (for example, by the same width as the scan width W). For example, it is divided into frame images each having 512× 512 pixels. In other words, a stripe region image of each inspection stripe 20 is divided into a plurality of frame images (optical images) by the width the same as that of the inspection stripe 20, for example, by the scan width W. By this processing, a plurality of frame images (optical images) corresponding to a plurality of frame regions 30 are acquired. A plurality of frame images of the evaluation pattern are stored in the memory 52.

In the determination step (S106), the determination unit 66 determines whether image-capturing of the evaluation patterns, for which the focus position has been changed a predetermined number of times (a plurality of focus positions described above), is completed or not. When image-capturing at the focus positions of a predetermined number of times has been completed, it proceeds to the profile synthesizing step (S110). When image-capturing at the focus positions of a predetermined number of times has not been completed yet, it proceeds to the focus position change step (S108).

In the focus position change step (S108), the focus position change unit 64 changes the focus position with respect to the mask substrate 101 surface (pattern forming surface) of the magnifying optical system 104 from the initial position to another position. It should be changed to the position next to the initial position in a plurality of predetermined focus positions. For example, the focus position is changed from the initial position (−100 nm) to the next position (−80 nm). Then, it returns to the evaluation pattern image-capturing step (S104), and each step from the evaluation pattern image-capturing step (S104) to the focus position change step (S108) is repeated until it is determined at the determination step (S106) that image-capturing at the focus positions of a predetermined number of times has been completed. While repeating, in the focus position change step (S108), the focus position is changed to one of a plurality of predetermined focus positions one by one.

As described above, the optical image acquisition mechanism 150 acquires a plurality of optical images while variably changing the focus position, using the evaluation substrate 300 on which evaluation patterns with variable duty ratio and pitch size are formed. Therefore, a plurality of frame images in the same region each having a different focus position are accumulated in the storage device 52.

In the profile synthesizing step (S110), the synthesis unit 70 reads a plurality of frame images of the same region each having a different focus position from the storage device 52, and, for each figure pattern in the image, superimposes (synthesizes) data of gray-scale value profiles of the same figure pattern. As a result, as having been described with reference to FIG. 5, different data of gray-scale value profiles are superimposed for each focus position. Evaluation patterns are configured by a plurality of figure patterns where each size of the line width L, duty ratio, and pitch P of a rectangular pattern is variable. Therefore, profile synthesis is performed for each figure pattern.

In the detection threshold extraction step (S112), the detection threshold extraction unit 72 extracts, as a detection threshold, a gray-scale value level of width dimension at which, when data of gray-scale value profiles of the same figure pattern in a plurality of frame images (optical images) acquired at different focus positions are superimposed, the data of gray-scale value profiles are identical to each other. In other words, a gray-scale value level at which the influence of the focus position on width dimension becomes smaller (for example, line width dimensions (e.g., dimension between A and B and dimension between a and b in the case of FIG. 5) are identical to each other independent of the focus position, or the influence of the focus position on width dimension becomes minimum) is extracted, as a detection threshold Th, for each design dimension by combination of line width L, duty ratio, and pitch P of a rectangular pattern, and for each design dimension by combination of line width S, duty ratio, and pitch P of a space pattern.

In the correlation table generation step (S114) of between line width CD information and detection threshold Th, the correlation table generation unit 74 generates correlation information in which a detection threshold corresponds to figure pattern design dimension information in design data serving as a base for forming a figure pattern corresponding to the detection threshold concerned on the evaluation substrate. Here, a correlation table is generated as the correlation information. Specifically, the correlation table generation unit 74 reads data in design data on a plurality of figure patterns configuring evaluation patterns from the storage device 54. Then, using design dimension condition information on combination of line width L, duty ratio, and pitch P of a rectangular pattern, as one line width CD information (design dimension information), and design dimension condition information on combination of line width S, duty ratio, and pitch P of a space pattern, as another line width CD information (design dimension information), the correlation table generation unit 74 generates a correlation table (correlation information) indicating correlation between each line width CD information and its corresponding detection threshold Th at which line width dimensions (e.g., dimension between A and B and dimension between a and b in the case of FIG. 5) are identical to each other independent of the focus position. The generated correlation table is stored in the magnetic disk drive 109.

As described above, according to the first embodiment, a correlation table is previously generated where it is possible to refer to a detection threshold that is variably set depending on line width CD information including design width dimension of a figure pattern. Then, using this correlation table, a deviation amount of a pattern width is measured with respect to the mask substrate 101 to be inspected. First, the evaluation substrate 300 is discharged, and the mask substrate 101 to be inspected is placed on the XYθ table 102. In that case, a pattern forming surface is placed downward.

Figure 10:
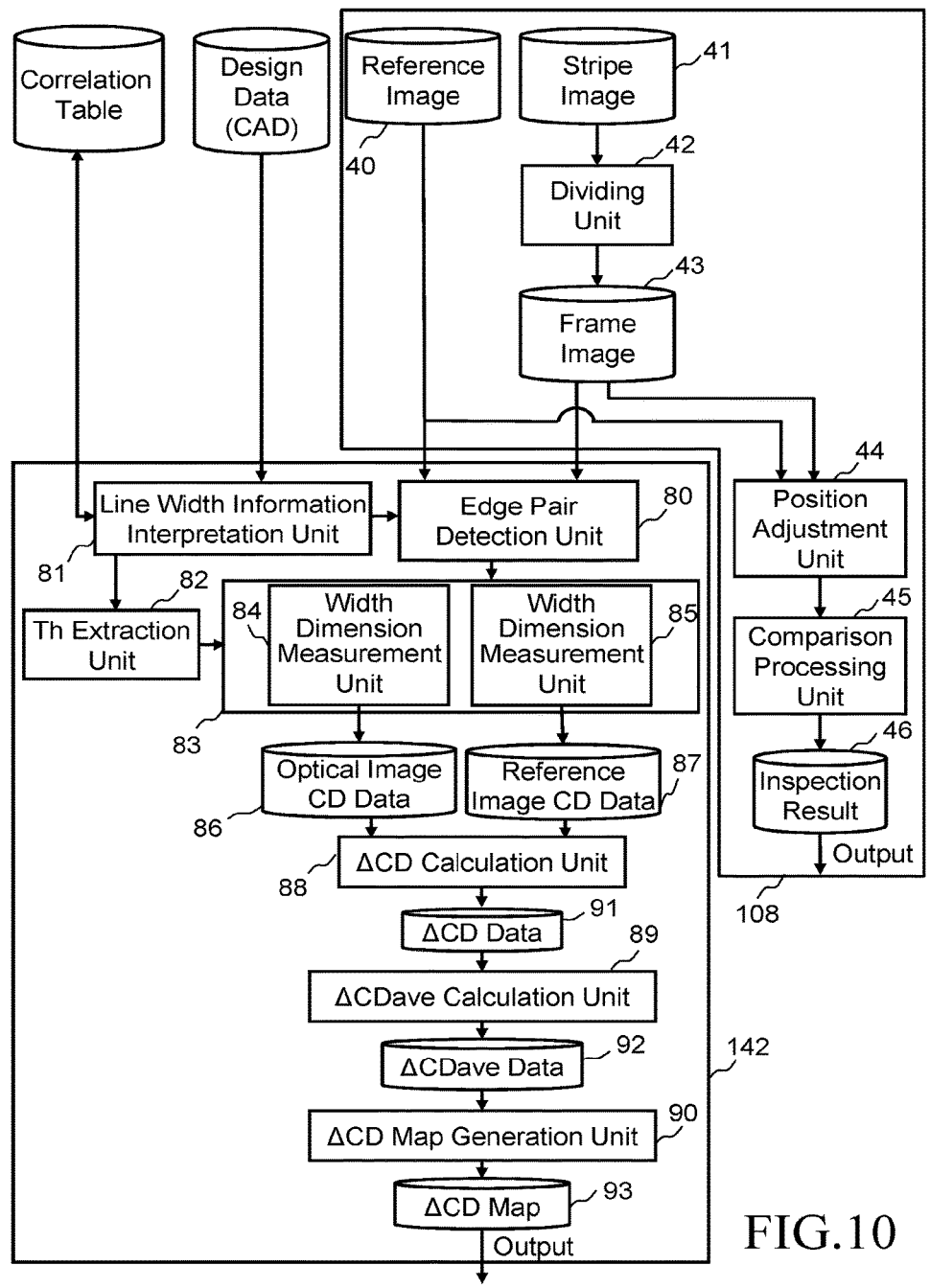
FIG. 10 shows an internal configuration of a comparison circuit and ΔCD map generation circuit according to the first embodiment.

FIG. 10 shows an internal configuration of a comparison circuit and ΔCD map generation circuit according to the first embodiment. As shown in FIG. 10, in the comparison circuit 108 of the first embodiment, there are arranged storage devices 40, 41, 43, and 46, such as magnetic disk drives, a dividing unit 42, a position adjustment unit 44, and a comparison processing unit 45. Each " . . . unit", such as the dividing unit 42, the position adjustment unit 44, and the comparison processing unit 45 includes a processing circuitry. As the processing circuitry, for example, an electric circuit, computer, processor, circuit board, quantum circuit, or semiconductor device may be used. Each " . . . unit" may use a common processing circuitry (same processing circuitry), or different processing circuitries (separate processing circuitries). Data required in the comparison circuit 180, and calculated results are stored in the memory (not shown) each time.

As shown in FIG. 10, in the ΔCD map generation circuit 142 of the first embodiment, there are arranged storage devices 86, 87, 91, 92, and 93, such as magnetic disk drives, an edge pair detection unit 80, a line width information interpretation unit 81, an inspection threshold Th extraction unit 82, a width dimension measurement unit 83, a width error ΔCD calculation unit 88, an average width error ΔCDave calculation unit 89, and a width error ΔCD map generation unit 90. Each " . . . unit", such as the edge pair detection unit 80, the line width information interpretation unit 81, the inspection threshold Th extraction unit 82, the width dimension measurement unit 83, the width error ΔCD calculation unit 88, the average width error ΔCDave calculation unit 89, and the width error ΔCD map generation unit 90 includes a processing circuitry. As the processing circuitry, for example, an electric circuit, computer, processor, circuit board, quantum circuit, or semiconductor device may be used. Each " . . . circuit" may use a common processing circuitry (same processing circuitry), or different processing circuitries (separate processing circuitries). Data required in the ΔCD map generation circuit 142, and calculated results are stored in the memory (not shown) each time.

Moreover, in the width dimension measurement unit 83, there are arranged an optical image line width measurement unit 84 and a reference image line width measurement unit 85. Each " . . . unit", such as the optical image line width measurement unit 84 and the reference image line width measurement unit 85 includes a processing circuitry. As the processing circuitry, for example, an electric circuit, computer, processor, circuit board, quantum circuit, or semiconductor device may be used. Each " . . . unit" may use a common processing circuitry (same processing circuitry), or different processing circuitries (separate processing circuitries). Data required in the optical image line width measurement unit 84 and the reference image line width measurement unit 85, and calculated results are stored in the memory (not shown) each time.

In the stripe image capturing step (S202), the optical image acquisition mechanism 150 acquires optical images of a plurality of figure patterns formed on the mask substrate 101. As described above, a strip region image (optical image) is acquired for each of a plurality of inspection stripes 20 (stripe regions) which are obtained by virtually dividing the inspection region 10 of the mask substrate 101 into a plurality of strip-shaped regions.

A pattern formed on the mask substrate 101 is irradiated with a laser light (e.g., DUV light), from the appropriate light source 103 through the illumination optical system 170, which is used as an inspection light and whose wavelength is shorter than or equal to that of the ultraviolet region. The light having passed through the mask substrate 101 is focused, through the magnifying optical system 104, to form an image on the photodiode array 105 (an example of a sensor) as an optical image to be input thereinto.

A pattern image focused/formed on the photodiode array 105 is photoelectrically converted by each light receiving element of the photodiode array 105, and further, analog-to-digital (A/D) converted by the sensor circuit 106. Then, pixel data for each inspection stripe 20 is stored in the stripe pattern memory 123. When imaging such pixel data (stripe region image), a dynamic range whose maximum gray level is defined as the case of, for example, 100% of the quantity of illumination light being incident is used as the dynamic range of the photodiode array 105. Then, the stripe region image is sent to the comparison circuit 108, with data indicating the position of the photomask 101 on the XYθ table 102 output from the position circuit 107. Measurement data (pixel data) is 8-bit unsigned data, for example, and indicates a gray level (light intensity) of brightness of each pixel. The stripe region image input into the comparison circuit 108 is stored in the memory 41.

In the dividing-into-frames step (S204), for each inspection stripe 20, the dividing unit 42 divides, in the x direction, a stripe region image (optical image) into a plurality of frame images (optical images) by a predetermined size (for example, by the same width as the scan width W). For example, it is divided into frame images each having 512× 512 pixels. In other words, a stripe region image of each inspection stripe 20 is divided into a plurality of frame images (optical images) by the width the same as that of the inspection stripe 20, for example, by the scan width W. By this processing, a plurality of frame images (optical images) corresponding to a plurality of frame regions 30 are acquired. A plurality of frame images are stored in the memory 43. As described above, the inspection region 10 of the mask substrate 101 is divided into a plurality of frame regions 30 (inspection small regions). Then, a frame image (optical image) is acquired for each of a plurality of frame regions 30 (inspection small regions).

In the reference image generation step (S206), a reference image generation circuit (reference image generation processing circuit), such as the development circuit 111 and the reference circuit 112, generates a reference image of the region corresponding to a frame image (optical image), based on design data serving as a basis for forming a plurality of figure patterns on the mask substrate 101. Here, a plurality of reference images (design images) corresponding to a plurality of frame regions 30 are generated. Specifically, it operates as described below. First, the development circuit 111 reads design data from the magnetic disk drive 109 through the control computer 110, converts each figure pattern in each frame region defined in the design data having been read into image data of binary values or multiple values, and transmits the image data to the reference circuit 112. Figure pattern information in this design data is defined by data, such as vector data, etc., differing from the image data defined by the pixel value (gray scale value) of each pixel.

Here, basics of figures defined in the design data are, for example, rectangles or triangles. The design data includes figure data that defines the shape, size, position, and the like of each pattern figure by using information, such as coordinates (x, y) of the reference position of a figure, lengths of sides of the figure, and a figure code serving as an identifier for identifying the figure type, namely a rectangle, a triangle and the like.

When information on a design pattern, used as figure data, is input to the development circuit 111, the data is developed into data of each figure. Then, the figure code, figure dimensions and the like indicating the figure shape in the figure data are interpreted. Then, the development circuit 111 develops and outputs design image data of binary values or multiple values as a pattern to be arranged in a square in units of grids of predetermined quantization dimensions. In other words, the development circuit 111 reads design data, calculates the occupancy rate occupied by figures in a design pattern for each grid obtained by virtually dividing an inspection region into grids in units of predetermined dimensions, and outputs n-bit occupancy rate data. For example, it is preferable that one grid is set as one pixel. If one pixel is given resolution of $1/2^8$ (=1/256), 1/256 small regions are allocated to the region of figures arranged in a pixel in order to calculate the occupancy rate in the pixel. Then, it is output, as 8-bit occupancy rate data, to the reference circuit 112.

The reference circuit 112 performs appropriate filter processing on the design image data being transmitted image data of a figure.

Figure 11:
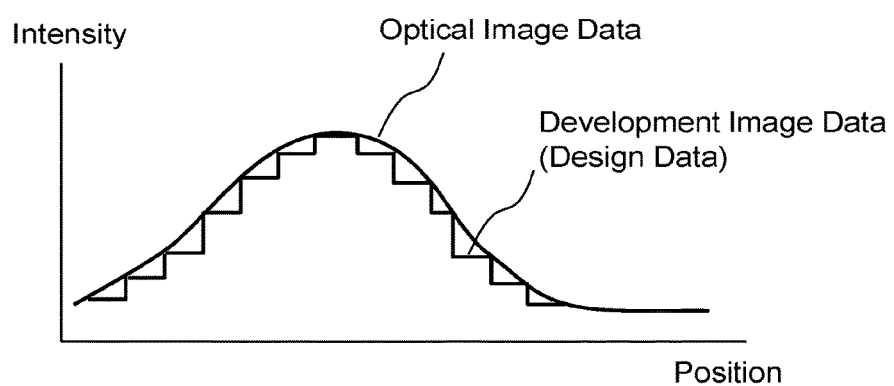
FIG. 11 illustrates filter processing according to the first embodiment.

FIG. 11 illustrates filter processing according to the first embodiment. Since the measurement data as an optical image obtained from the sensor circuit 106 is in the state affected by the filtering due to resolution characteristics of the magnifying optical system. 104, an aperture effect of the photodiode array 105, or the like, in other words, in the analog state continuously changing, it is possible to match the design image data with the measurement data by also performing filter processing on design image data being image data on the design side having image intensity (gray value) represented by digital values. In this manner, a design image (reference image) to be compared with a frame image (optical image) is generated. The generated reference image is input into the comparison circuit 108 to be stored in the memory 40.

As described above, a plurality of reference images each having a plurality of figure patterns in accordance with a plurality of frame regions 30 are generated based on design data in which each of a plurality of figure patterns is defined for each of a plurality of frame regions 30 having different positions. Thereby, a plurality of reference images are generated to be corresponding to a plurality of frame images in each inspection stripe 20 image-captured from the mask substrate 101.

In the edge pair detection step (S208), the edge pair detection unit 80 recognizes the position of an edge portion (outer periphery) of a pattern in a corresponding reference image for each frame image (frame region 30) to detect an edge portion in the frame image to be a pair with the pattern edge portion of the reference image. An edge pair composed of the edges of both ends (both the peripheries) configuring a line width (CD) of a pattern is detected, for example, per pixel. For example, with respect to a frame region of an x-direction line and space pattern, a pair is detected for each pixel on the line pattern periphery extending in the y direction. For example, with respect to a frame region of a y-direction line and space pattern, a pair is detected for each pixel on the line pattern periphery extending in the x direction. With respect to a frame region of a plurality of quadrangular patterns, a pair is detected for each pixel on the periphery extending in the y direction of each quadrangular pattern. With respect to a frame region of a plurality of quadrangular patterns, a pair is detected for each pixel on the periphery extending in the x direction of each quadrangular pattern.

It is also preferable to detect an edge pair with respect to CD in a space portion (white portion) between adjacent patterns as well as CD in a black portion where a pattern exists, for each frame region 30.

In the line width information interpretation step (S210), the line width information interpretation unit 81 (first extraction processing circuit) extracts, based on design data, design dimension information on a plurality of figure patterns in the region corresponding to a frame image (optical image). Specifically, referring to design data stored in the magnetic disk drive 109, the line width information interpretation unit 81 reads design dimension information including design width dimension (CD) of the figure pattern concerned, for each figure pattern indicated by a detected edge pair. Then, the line width information interpretation unit 81 interprets a design width dimension (CD), an arrangement pitch P, and a duty ratio of the figure pattern concerned from the design dimension information on the figure pattern concerned. Then, the line width information interpretation unit 81 outputs each acquired information on the design width dimension (CD), arrangement pitch P and duty ratio to the inspection threshold Th extraction unit 82.

In the detection threshold Th extraction step (S212), the inspection threshold Th extraction unit 82 (second extraction processing circuit) reads a detection threshold Th for each design dimension information on an extracted figure pattern, using correlation information between design dimension information on a figure pattern, and a detection threshold. Specifically, referring to the correlation table stored in the magnetic disk drive 109, the inspection threshold Th extraction unit 82 reads a detection threshold Th corresponding to the design width dimension (CD), arrangement pitch P, and duty ratio of the figure pattern concerned.

In the line width measuring step (S214), the width dimension measurement unit 83 measures width dimensions for inspection of a plurality of figure patterns in an image range, from each gray-scale value profile data of a frame image (optical image) and a reference image, using a detection threshold Th corresponding to design dimension information. Specifically, it operates as described below.

In the optical image line width measuring step (S216), the optical image line width measurement unit 84 (first width dimension calculation unit (first width dimension calculation processing circuit)) measures width dimensions for inspection of a plurality of figure patterns in a frame image (optical image) from the gray-scale value profile data of the frame image (optical image), using a gray-scale value level, as a detection threshold Th, which is variably set depending on design dimension information including design width dimension of a figure pattern, and at which the influence of the focus position on width dimension becomes smaller (for example, line width dimensions are identical to each other independent of the focus position, or the influence of the focus position on width dimension becomes minimum). Here, for each figure pattern indicated by a detected edge pair, a line width (width dimension for inspection), where line width dimensions are identical to each other independent of the focus position, is measured using a detection threshold Th as shown in FIG. 5, instead of a line width CD (design width dimension) in design data being measured as described above.

Figure 12:
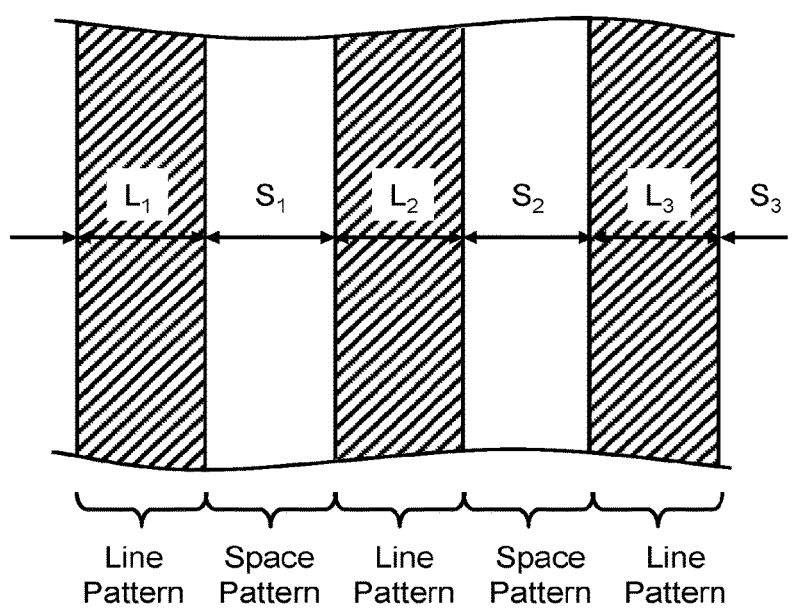
FIG. 12 shows an example of a line width to be measured according to the first embodiment.

FIG. 12 shows an example of a line width to be measured according to the first embodiment. It is preferable, as shown in FIG. 12, to measure the line widths L1, L2, and L3 of the line patterns as well as the line widths S1, S2, and S3 of the space patterns.

In the reference image line width measuring step (S218), the reference image line width measurement unit 85 (second width dimension calculation unit (second width dimension calculation processing circuit)) measures width dimensions for inspection of a plurality of corresponding figure patterns in a reference image from the gray-scale value profile data of the reference image, using the same detection threshold Th. Here, for each figure pattern indicated by a detected edge pair, a line width at the same gray-scale value level as that of the line width (width dimension for inspection) at which the influence of the focus position on width dimension in an optical image becomes smaller (for example, line width dimensions are identical to each other independent of the focus position, or the influence of the focus position on width dimension becomes minimum) is measured from the gray-scale value profile data of a reference image, using the same detection threshold Th as that used in measuring in a frame image (optical image).

In the width error ΔCD calculation step (S220), the width error ΔCD calculation unit 88 (dimension deviation amount calculation unit (dimension deviation amount calculation processing circuit)) calculates, for each measured width dimension for inspection of a figure pattern in a frame image (optical image), a dimension deviation amount deviated from the measured width dimension for inspection of a corresponding figure pattern in a reference image. With respect to the detection threshold $Th_0$ used for measuring a line width CD (design width dimension) in design data as shown in FIG. 2, when the detection threshold Th of the first embodiment is set to Th', for example, the optical image line width measurement unit 84 measures the dimension between A' and B' as a width dimension for inspection. The reference image line width measurement unit 85 measures the dimension between E' and F' as a width dimension for inspection. Then, the width error ΔCD calculation unit 88 calculates a width error ΔCD by subtracting the dimension between E' and F' from the dimension between A' and Br. The calculated width error ΔCD is output to the storage device 91 to be stored therein.

Figure 13A:
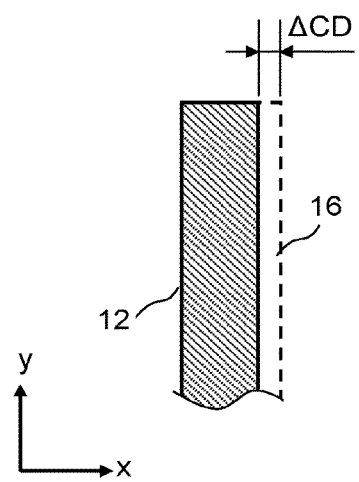
FIGS. 13A and 13B show examples of a width error ΔCD according to the first embodiment.
Figure 13B:
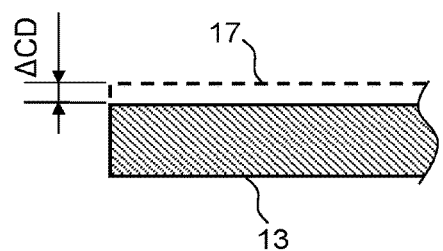

FIGS. 13A and 13B show examples of a width error ΔCD according to the first embodiment. FIG. 13A shows a width error ΔCD in the x direction obtained by subtracting the line width of a line pattern 16 of a reference image from the line width of a line pattern 12 extending in the y direction of an optical image. FIG. 13B shows a width error ΔCD in the y direction obtained by subtracting the line width of a line pattern 17 of a reference image from the line width of a line pattern 13 extending in the x direction of an optical image. The difference value calculated by subtracting the line width of the line pattern 16 of the reference image from the line width of the line pattern 12 of the optical image detected by the detection threshold $Th_0$ which is for measuring a line width CD (design width dimension) in design data, and the difference value calculated by subtracting the line width of the line pattern 16 of the reference image from the line width of the line pattern 12 of the optical image detected by the detection threshold Th which is for measuring a width dimension for inspection that makes the influence of the focus position on width dimension smaller (for example, line width dimensions are identical to each other independent of the focus position, or the influence of the focus position on width dimension becomes minimum) are substantially identical to each other. Therefore, by calculating a difference value between width dimensions for inspection, a width error ΔCD can be calculated similarly to the case of measuring a line width CD (design width dimension) in design data.

In the average width error ΔCDave calculation step (S222), the average width error ΔCDave calculation unit 89 calculates a statistic value, such as an average (average width error ΔCDave), with respect to width errors ΔCD of a plurality of figure patterns in the same frame image (optical image). For example, the average width error ΔCDave calculation unit 89 calculates an average of width errors ΔCD in the x direction, and an average of width errors ΔCD in the y direction. Alternatively, an average may be calculated for collected width errors ΔCD in the x and y direction. Thereby, one ΔCDave with respect to the x direction and one ΔCDave with respect to the y direction can be calculated for each frame region 30. The calculated average width error ΔCDave is output to the storage device 92 to be stored therein. Instead of the average value, a median, a maximum, or a head value may be calculated as a statistic value.

In the width error ΔCD map generation step (S224), the width error ΔCD map generation unit 90 generates a width deviation amount ΔCD map in which a width deviation amount ΔCD (ΔCDave) of a figure pattern is defined for each frame region 30 (inspection small region). Statistic values, such as average values, of figure pattern width deviation amounts of respective frame regions 30 are defined in the width deviation amount ΔCD map. The generated ΔCD map is output to the storage device 93, to be stored therein. The ΔCD map stored in the storage device 93 is output, for example, to the magnetic disk drive 109, magnetic tape drive 115, FD 116, CRT 117, pattern monitor 118, or printer 119. Alternatively, it may be output outside.

As described above, according to the first embodiment, even if a following error of the focus position in the AF control occurs, CD deviation (ΔCD) can be measured with great precision. Therefore, a highly accurate ΔCD map can be generated. Consequently, it is possible to inspect whether deviations of the critical dimensions (CD) of a plurality of figure patterns formed on the mask substrate 101 are within a required accuracy range or not. Moreover, since the ΔCDave is defined for each frame region 30, it is thus possible to find and ascertain the amount of deviation depending on the position.

What is referred to as the " . . . circuit" in the above description includes a processing circuitry. As the processing circuitry, for example, an electric circuit, computer, processor, circuit board, quantum circuit, or semiconductor device may be used. Each " . . . circuit" may use a common processing circuitry (same processing circuitry), or different processing circuitries (separate processing circuitries). A program used in the case where the processing circuitry is configured by at least one computer or at least one processor is stored in a recording medium, such as a magnetic disk drive, magnetic tape drive, FD, ROM (Read Only Memory), etc. For example, the position circuit 107, comparison circuit 108, development circuit 111, reference circuit 112, autoloader control circuit 113, table control circuit 114, correlation table generation circuit 140, CD deviation (ΔCD) map generation circuit 142, AF control circuit 144, and the like which constitute the operation control unit may be configured by an electric circuit. Alternatively, they may be implemented by at least one computer or processor such as the control computer 110, etc.

Embodiments have been explained referring to specific examples described above. However, the present invention is not limited to these specific examples. For example, in Embodiments, although a transmitted illumination optical system using a transmitted light is described as the illumination optical system 170, it is not limited thereto. For example, a reflected illumination optical system using a reflected light may also be used. Alternatively, a transmitted light and a reflected light may be used simultaneously by way of combining a transmitted illumination optical system and a reflection illumination optical system.

While the apparatus configuration, control method, and the like not directly necessary for explaining the present invention are not described, some or all of them can be selectively used on a case-by-case basis when needed. For example, although description of the configuration of the control unit for controlling the inspection apparatus 100 is omitted, it should be understood that some or all of the configuration of the control unit can be selected and used appropriately when necessary.

In addition, any other pattern inspection apparatus, pattern inspection method, and inspection sensitivity evaluation method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern width deviation measurement method comprising:
acquiring an optical image of a plurality of figure patterns formed on a mask substrate;
generating a reference image of a region corresponding to the optical image, based on design data serving as a base for forming the plurality of figure patterns on the mask substrate;
measuring width dimensions of the plurality of figure patterns in the optical image from data of gray-scale value profiles of the optical image, using a detection threshold of a gray-scale value level which is variably set depending on design dimension information including design width dimension of a corresponding figure pattern of the plurality of figure patterns, and at which influence of a focus position on width dimension becomes smaller;
measuring width dimensions of a plurality of corresponding figure patterns in the reference image from data of gray-scale value profiles of the reference image, respectively using the detection threshold for the corresponding figure pattern of the plurality of figure patterns; and
calculating, for each of measured width dimensions of the plurality of figure patterns in the optical image, a dimension deviation amount deviated from a measured width dimension of a corresponding figure pattern in the reference image, and outputting the dimension deviation amount calculated.

2. The method according to claim 1, further comprising:
extracting, based on the design data, design dimension information on the plurality of figure patterns in the region corresponding to the optical image; and
reading a detection threshold for each extracted design dimension information on each of the plurality of figure patterns, using correlation information between the design dimension information on the plurality of figure patterns and the detection threshold.

3. The method according to claim 1, further comprising:
acquiring a plurality of optical images while variably changing the focus position, using an evaluation substrate on which evaluation patterns with variable duty ratio and pitch size are formed;
extracting, as a detection threshold, a gray-scale value level of width dimension at which, when the data of the gray-scale value profiles of a same figure pattern in a plurality of optical images acquired at different focus positions are superimposed, the data of the gray-scale value profiles are identical to each other; and
generating the correlation information in which the detection threshold corresponds to design dimension information of a figure pattern in design data serving as abase for forming a figure pattern corresponding to the detection threshold on the evaluation substrate.

4. The method according to claim 1, wherein
an inspection region of the mask substrate is divided into a plurality of inspection small regions, and
the optical image is acquired for each of the plurality of inspection small regions,
further comprising:
generating a width deviation amount map in which a width deviation amount of a figure pattern is defined for the each of the plurality of inspection small regions.

5. The method according to claim 4, wherein, when a plurality of figure patterns are arranged in a same inspection small region of the plurality of inspection small regions, a statistic value for width deviation amounts of the plurality of figure patterns in the same inspection small region is defined in the width deviation amount map, as the width deviation amount of the figure pattern for the same inspection small region.

6. The method according to claim 5, wherein the detection threshold corresponding to the design dimension information is measured in advance using an evaluation substrate different from the mask substrate, before acquiring the optical image of the plurality of figure patterns formed on the mask substrate.

7. A pattern inspection apparatus comprising:
- an optical image acquisition mechanism, including a stage on which a mask substrate where a plurality of figure patterns are formed is placed and an illumination optical system for illuminating the mask substrate, configured to acquire an optical image of the plurality of figure patterns formed on the mask substrate;
- a reference image generation processing circuitry configured to generate a reference image of a region corresponding to the optical image, based on design data serving as a base for forming the plurality of figure patterns on the mask substrate;
- a first width dimension calculation processing circuitry configured to measure width dimensions of the plurality of figure patterns in the optical image from data of gray-scale value profiles of the optical image, using a detection threshold of a gray-scale value level which is variably set depending on design dimension information including design width dimension of a corresponding figure pattern of the plurality of figure patterns, and at which influence of a focus position on width dimension becomes smaller;
- a second width dimension calculation processing circuitry configured to measure width dimensions of a plurality of corresponding figure patterns in the reference image from data of gray-scale value profiles of the reference image, respectively using the detection threshold for the corresponding figure pattern of the plurality of figure patterns; and
- a dimension deviation amount calculation processing circuitry configured to calculate, for each of measured width dimensions of the plurality of figure patterns in the optical image, a dimension deviation amount deviated from a measured width dimension of a corresponding figure pattern in the reference image.

8. The apparatus according to claim 7, further comprising:
- a first extraction processing circuitry configured to extract the design dimension information on the corresponding figure pattern in the region corresponding to the optical image, based on the design data.

9. The apparatus according to claim 8, further comprising:
- a second extraction processing circuitry configured to extract the detection threshold corresponding to extracted design dimension information on the corresponding figure pattern.

10. The apparatus according to claim 9, wherein the design dimension information on the corresponding figure pattern includes the design width dimension, an arrangement pitch, and a duty ratio.

* * * * *